Feb. 13, 1951     C. O. SLEMMONS     2,541,177
TRACTION APPARATUS FOR VEHICLES
Filed Aug. 30, 1945     2 Sheets-Sheet 1
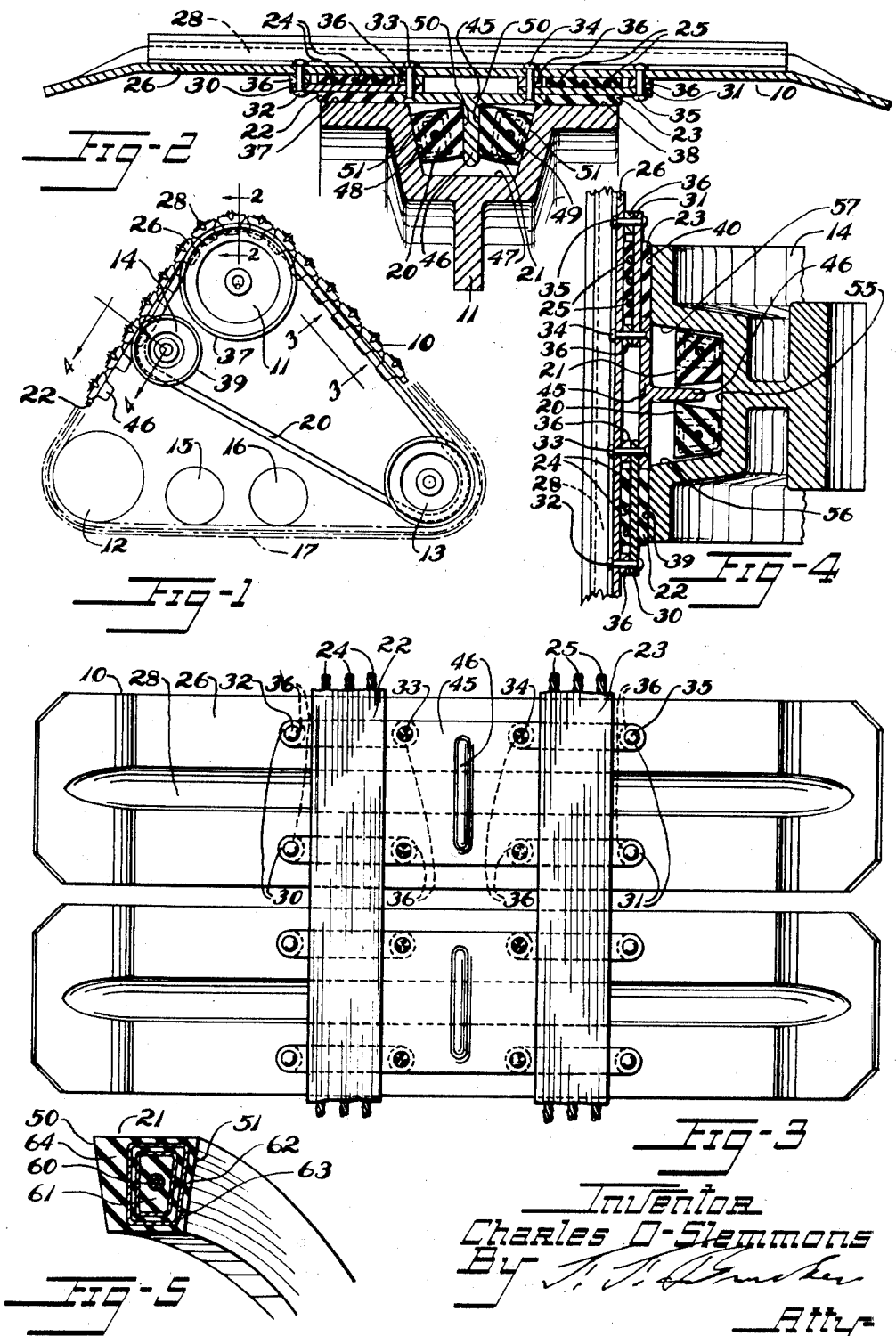
Inventor
Charles O. Slemmons

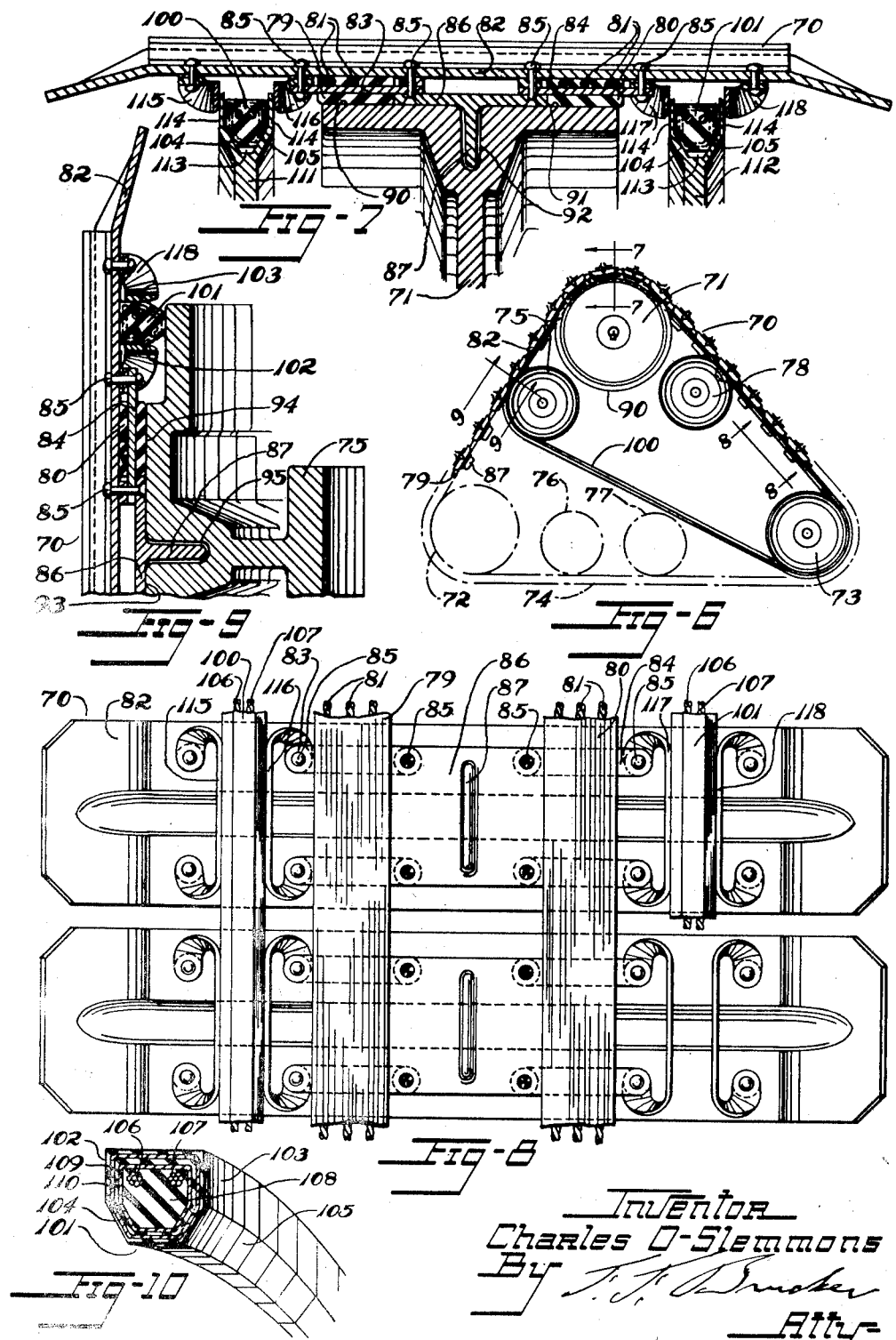
Feb. 13, 1951 — C. O. SLEMMONS — 2,541,177
TRACTION APPARATUS FOR VEHICLES
Filed Aug. 30, 1945 — 2 Sheets-Sheet 2
Inventor
Charles O. Slemmons Patented Feb. 13, 1951

2,541,177

UNITED STATES PATENT OFFICE 2,541,177

TRACTION APPARATUS FOR VEHICLES

Charles O. Slemmons, Akron, Ohio, assignor to The B. F. Goodrich Company, New York, N. Y., a corporation of New York Application August 30, 1945, Serial No. 613,472

11 Claims. (Cl. 305—2)

This invention relates to traction apparatus for vehicles and is especially useful for driving tractors and other vehicles of the self-laying track type.

Objects of the invention are to provide a friction-driven track; to provide a friction driven track having flotation shoes incorporated therein; to provide a friction driven track having stiff positive guiding means; to provide a high degree of gripping of the track by the driving mechanism; to provide free rolling of the track throughout a portion of its travel and frictional engagement of the track throughout another portion thereof; to provide cushioning of the track from the wheels; and to provide quiet and efficient operation.

These and other objects will appear from the following description and the accompanying drawings.

Of the drawings:

Fig. 1 is a side elevation of the traction apparatus of the invention in one of its embodiments.

Fig. 2 is a cross-section thereof on line 2—2 of Fig. 1, showing the track with the driving wheel and the driving belts.

Fig. 3 is an inside face view of a portion of the track taken on line 3—3 of Fig. 1.

Fig. 4 is a cross-section of the drive taken on line 4—4 of Fig. 1 showing the track, the idler wheel, and the driving belts, parts being broken away.

Fig. 5 is a perspective view of a section of one of the driving belts.

Fig. 6 is a side elevation of traction apparatus showing a modified construction.

Fig. 7 is a cross-section thereof taken on line 7—7 of Fig. 6 showing the track with the driving wheel and the driving belts.

Fig. 8 is a face view of the inner side of the track taken on line 8—8 of Fig. 6.

Fig. 9 is a cross-sectional view of the drive taken on line 9—9 of Fig. 6 showing the track, the idler wheel, and the driving belts, parts being broken away.

Fig. 10 is a perspective view of a section of one of the driving belts.

Referring to the drawings, and first to Figs. 1 to 5, which illustrate a drive constructed in accordance with and embodying the invention, the numeral 10 designates an endless track trained above a drive wheel 11 and idler wheels 12 and 13. Additional idler wheels are provided at 14, 15 and 16, all of said wheels being arranged tangent to the track for guiding and supporting it so as to provide a substantially flat reach 17 of the track for contact with the ground.

For driving the track from the drive wheel, a pair of parallel endless flexible driving belts 20, 21 are arranged to encompass the drive wheel 11 and the idler wheels 13 and 14, the belts being arranged to extend between these three wheels and the track passing thereabout, and the belts being unattached to the wheels and the track and thereby being capable of departing from both the wheels and the track for a shorter course of travel as shown in Fig. 1.

The track as seen from Figs. 2, 3 and 4 comprises spaced-apart parallel smooth surfaced bands 22, 23 of soft vulcanized rubber, either natural or synthetic, or other material having the physical properties of soft, vulcanized rubber, all of such materials being hereinafter referred to as rubber-like material, for producing smooth resilient contact with the wheels.

For providing high tensile strength of the track, tension elements 24, 25 are embedded in the rubber-like material of the bands 22, 23 in spaced-apart parallel relation and are secured to the rubber-like material by vulcanization. The tension elements are preferably of cord or cable formed from twisted wires or textile fibers and may comprise endless grommets or successive convolutions of the same tension element. Track shoes 26, providing flotation by contact with the ground over a great area, and bridging of the load between idler wheels, are arranged in succession along the bands 22, 23 of rubber-like material and are preferably of sheet metal stampings recessed as at 28 in a direction crosswise of the track to provide stiffness, the shoes extending for a considerable distance laterally of the bands 22, 23 to provide a large area of contact of the track with the ground, thereby providing flotation or snow shoe action of the track over soft or loose ground.

For securing the shoes to the bands 22, 23, cross-bars 30, 31 are embedded respectively in the bands 22, 23 with their ends extending laterally beyond the bands where they are secured by rivets 32, 33, 34, 35, or other fastening means, to the track shoes, spacers 36 being provided between the ends of the cross-bars and the shoes so that the track members 24, 25 are not gripped by the shoes but have resilient connection thereto by reason of the rubber-like material which extends between the cross-bars and the cables and between the shoes and the cables.

For supporting the track from the drive wheel 11 cylindrical bearing surfaces 37, 38 are provided on the drive wheel 11 for contact with the bands 22, 23 respectively, and similar cylindrical supporting surfaces 39, 40 are provided on the idler wheel 14 and upon the wheels 12, 13, 15 and 16. These surfaces make continuous contact with the bands 22, 23, and operate in rolling engagement therewith.

The invention contemplates the gripping of the track throughout a portion of its extent for driving purposes and free running of the track throughout other portions. For driving the track driving plates 45 are secured one to each shoe 26 by the rivets 33, 34 and these shoes are provided with stiff inwardly extending driving flanges 46 adapted to extend between the driving belts 20, 21. For providing gripping engagement of the driving belts of the driving wheel 11 with the track, the drive wheel is formed with a peripheral trough between the supporting surfaces 37 and 38. The trough has outwardly diverging side faces 48, 49 arranged in such close relation to each other as to wedge tightly the driving belts 20, 21 which are of trapezoidal cross-section, between the driving members 46 and the sides 48, 49 of the trough. The sides 48, 49 of the trough preferably include an angle of 30 degrees or less and side faces 50, 51 of the belts are arranged at an angle substantially one-half that of the trough.

For releasing the belts from driving relation to the track at the idler wheel 14, the idler wheel is formed with a peripheral groove 55 between its track supporting faces 39 and 40 and this groove has outwardly diverging side faces 56, 57 similar to the trough of the driving wheel 11. The sides of the groove 55, however, are arranged farther apart than the sides of the trough 47 by a distance sufficient to permit lateral separation of the driving belts 20, 21 from the driving flanges 46. The idler wheel 13 has a groove identical with the groove 55 of the wheel 14 and the driving belts 20, 21 pass directly from the wheel 14 to the wheel 13 and then to the drive wheel 11. Contact of the driving belts 20, 21 with the wheels 13 and 14 is with the bottom of their peripheral grooves as seen in Fig. 4. The arrangement is such that the driving of the drive flanges 46 by the belts 20, 21 only occurs about the arc of contact of the track with the drive wheel 11.

The driving belts 20, 21 may be of any desired construction but preferably each comprises an endless grommet 60 of cord or cable embedded in a body 61 of rubber-like material surrounded by plies 62, 63 of textile material which in turn is surrounded by a body 64 of rubber-like material providing a protective coating, the protective coating being preferably thicker at the side of the belt which contacts with the driving flanges 46 in order to provide high resilience of the belt at the face engaging the track.

Referring to Figs. 7 to 10 of the drawings, the track 70 is trained about the drive wheel 71 and idler wheels 72, 73 arranged on parallel axes and providing a substantially flat reach 74 of the track for contact with the ground as in the form of the invention previously described. Other idler wheels 75, 76, 77, 78 are arranged within the track and tangential thereto. The track 70 comprises parallel bands 79, 80 of rubber-like material arranged in spaced-apart parallel relation and reinforced by tension elements 81 and the bands are held in spaced-apart relation by consecutively arranged track shoes 82 which extend transversely of the bands and are secured thereto by cross-bars 83, 84 extending laterally of the bands and embedded therein respectively with their ends extending laterally thereof and secured to the shoes as by rivets 85.

Guiding plates 86 are secured to the shoes between the bands and have inwardly extending guiding flanges 87 formed thereon for guiding the track with respect to the wheels. The driving wheel 71 is formed with spaced-apart cylindrical driving faces 90, 91 for engaging the bands 79, 80 respectively, and separated by a guiding groove 92 for receiving the guiding flanges 87. The idler pulley 75 is similarly formed with cylindrical faces 93, 94 for contacting the bands arranged in spaced-apart relation and separated by a groove 95 for guiding the guide flanges 87. The guide wheels 72, 73, 76, 77, 78 are identical in form to the guide wheels 75.

For driving the track from the drive wheel 71, a pair of flexible endless belts 100, 101 are provided. These extend about wheels 71, 78, 73 and 75. These belts as shown in Fig. 10 are of generally rectangular cross-section having opposite parallel side faces 102, 103 at their outer portions and inwardly converging bevelled faces 104, 105 inwardly thereof. These belts may be of any desired construction but preferably have a pair of spaced-apart endless grommets 106, 107 embedded in a body 108 of rubber-like material surrounded by plies 109, 110 of textile material such as square woven fabric, preferably arranged in bias fashion.

For providing driving engagement, the driving wheel 71 is provided with driving members 111, 112 which may be in the form of separate wheels fixed to the same shaft as the driving wheel 71, or may be integral therewith. These driving members are provided with peripheral driving grooves 113, each having outwardly divergent sides, for frictionally engaging the bevelled faces 104, 105 of the belts, and outwardly directed radial flanges 114 arranged to clear the sides of the belts for a purpose hereinafter explained. Each of the track shoes 82 has fixed thereto parallel driving members 115, 116 at one end thereof and 117, 118 at the other end thereof. Such driving members are formed of spring metal and are secured to the shoes adjacent the sides of the belts by rivets or other fastening means. The shoes 115, 116 are normally so located as to drive with the force the sides 102, 103 of belt 100 throughout the parallel travel of the belts with the track. However, as the track approaches the drive wheel 71, the parallel flanges 114 of the driving members 111, 112 engage between the spring driving members 115, 116 spreading the driving members apart so that the belt 100 is released from the driving members and is free to engage in the groove 113 of the driving member. The arrangement is such that the belts 100, 101 which are frictionally driven by the drive wheel 71 drive the track frictionally by clamping engagement with the spring driving members throughout portions of the travel of the track but release the belts as the track passes about the driving wheel 71.

In both illustrated embodiments of the invention good frictional engagement of the track with the belts is assured and quiet and smooth operation is provided by the smooth contact of the track with the driving and guiding wheels.

Variations may be made without departing from the invention as it is defined by the following claims.

I claim:

1. Traction apparatus for vehicles, said apparatus comprising a drive wheel, idler wheels, a flexible track encompassing said wheels as a group, and a flexible driving belt supported by at least some of said wheels and unattached to said wheels and said track, said driving belt being frictionally engaged and driven by said drive wheel and having frictional driving engagement with said track.

2. Traction apparatus for vehicles, said apparatus comprising a drive wheel and idler wheels arranged on parallel axes, a flexible track encompassing said wheels as a group, and a flexible driving belt encompassing less than the total number of said wheels as a group and having driving engagement with said drive wheel, said driving belt being unattached to said wheels and said track and being arranged to drive said track from said drive wheel.

3. Traction apparatus for vehicles, said apparatus comprising a drive wheel and idler wheels arranged in a generally triangular group on parallel axes, a flexible track encompassing said wheels as a group, and a flexible driving belt encompassing less than the total number of said wheels as a group and having driving engagement with said drive wheel, said driving belt being unattached to said wheels and said track and being arranged to drive said track from said drive wheel.

4. Traction apparatus for vehicles, said apparatus comprising a drive wheel and idler wheels arranged in a generally triangular group on parallel axes, a flexible track encompassing said wheels as a group, and a flexible driving belt encompassing some of said wheels as a group and having driving engagement with said drive wheel, said driving belt having contact with said drive wheel throughout an extent less than the perimeter of said drive wheel and having contact with said track throughout an extent less than the circumferential extent of said track and being arranged to travel between said drive wheel and said track to transmit power to said track from said drive wheel, and means on said track for gripping said belt.

5. Traction apparatus for vehicles, said apparatus comprising a drive wheel and idler wheels arranged in a generally triangular group on parallel axes, a flexible track encompassing said wheels as a group, and a driving belt encompassing some of said wheels as a group and having driving engagement with said drive wheel, said driving belt being arranged to travel between said drive wheel and said track to transmit power to said track from said drive wheel, and means on said track and said drive wheel for gripping said belt throughout a portion of the travel of the track and releasing it throughout another portion thereof.

6. Traction apparatus for vehicles, said apparatus comprising a drive wheel and idler wheels arranged in a generally triangular group on parallel axes, a flexible track encompassing said wheels as a group, and a driving belt encompassing some of said wheels as a group and having driving engagement with said drive wheel, said driving and idler wheels each having a guiding groove for guiding said track, guide means on said track for entering said grooves, said driving belt being arranged to travel between said guide means and said drive wheel as the track passes around said drive wheel in tight fitting driving relation and to travel freely about said idler wheels between said guide means and said idler wheels within the grooves thereof.

7. An endless track assembly comprising a drive wheel, an endless flexible belt of greater circumference than said wheel and trained thereabout, and an endless track of greater circumference than said belt and trained about said belt, said belt engaging frictionally between said wheel and said track for imparting driving motion from one to the other.

8. An endless track assembly comprising a drive wheel having a peripheral belt-receiving groove, an endless flexible belt seated in said groove, said belt being of greater circumference than said wheel and being trained thereabout, and an endless track of greater circumference than said belt and arranged thereabout, said belt engaging frictionally between said wheel and said track for imparting driving motion from one to the other.

9. An endless track assembly comprising a drive wheel having a peripheral groove thereabout, an endless track extending about said wheel and having means for engaging a belt about said wheel in wedging engagement of said track and said wheel with the belt, and a belt of less circumferential length than said track engaging frictionally between said wheel and said track for imparting motion from one to the other.

10. Traction apparatus for a vehicle, said apparatus comprising a drive wheel, idler wheels in alignment therewith and spaced therefrom, a flexible track encompassing said wheels as a group, a flexible driving belt in frictional driving engagement with said driving wheel and said track supported about and having contact with a plurality of but less than the total number of wheels of the group, said driving belt contacting the inner face of said track in frictional driving engagement therewith throughout a portion less than the circumferential extent of said track.

11. Traction apparatus for a vehicle, said apparatus comprising a drive wheel, idler wheels in alignment therewith and spaced therefrom, a flexible track encompassing said wheels as a group, a flexible driving belt in frictional driving engagement with said driving wheel and said track supported about and having contact with a plurality of but less than the total number of wheels of the group, said driving belt contacting the inner face of said track in frictional driving engagement therewith throughout a portion less than the circumferential extent of said track, said track having additional frictional driving contact directly with said drive wheel.

CHARLES O. SLEMMONS.

REFERENCES CITED

The following references are of record in the file of this patent:

UNITED STATES PATENTS

| Number | Name | Date |
| --- | --- | --- |
| 1,316,951 | Henderson | Sept. 23, 1919 |
| 1,397,314 | Cox | Nov. 15, 1921 |
| 1,487,340 | Kroupsky | Mar. 18, 1924 |
| 1,808,735 | Henneuse, et al. | June 2, 1931 |
| 2,139,070 | Dobbins | Dec. 6, 1938 |
| 2,184,441 | Smellie et al. | Dec. 26, 1939 |
| 2,393,721 | Tracy | Jan. 29, 1946 |
| 2,416,679 | Curtis | Mar. 4, 1947 |